US012709529B2

(12) United States Patent
Yahner

(10) Patent No.: US 12,709,529 B2
(45) Date of Patent: Aug. 18, 2026

(54) TORSION BAR ASSEMBLY FOR A MATERIAL HANDLING VEHICLE

(71) Applicant: The Raymond Corporation, Greene, NY (US)

(72) Inventor: Joseph T. Yahner, Chenango Forks, NY (US)

(73) Assignee: The Raymond Corporation, Greene, NY (US)

( * ) Notice: Subject to any disclaimer, the term of this patent is extended or adjusted under 35 U.S.C. 154(b) by 556 days.

(21) Appl. No.: 18/093,200

(22) Filed: Jan. 4, 2023

(65) Prior Publication Data

US 2023/0211990 A1 Jul. 6, 2023

Related U.S. Application Data

(60) Provisional application No. 63/296,664, filed on Jan. 5, 2022.

(51) Int. Cl.
*B66F 9/075* (2006.01)

(52) U.S. Cl.
CPC ...... *B66F 9/07586* (2013.01); *B66F 9/07568* (2013.01); *B66F 9/07572* (2013.01)

(58) Field of Classification Search
CPC .............. B66F 9/07586; B66F 9/07568; B66F 9/07572; B66F 9/07504; B60G 2202/134; B60G 2300/022; B60G 21/053; B60G 11/14; B60B 19/12; B60B 3/0612
See application file for complete search history.

(56) References Cited

U.S. PATENT DOCUMENTS

| | | | |
|---|---|---|---|
| 1,242,500 | A | 10/1917 | Wilcox |
| 1,378,445 | A | 5/1921 | Ferris |
| 1,906,238 | A | 5/1933 | Ramsey et al. |
| 2,339,940 | A | 1/1944 | Noros |
| 2,404,121 | A | 7/1946 | Black |
| 2,426,513 | A | 8/1947 | Linn |
| 2,438,432 | A | 3/1948 | Edwards |
| 2,438,571 | A | 3/1948 | Maxon, Jr. |
| 2,443,480 | A | 6/1948 | Schwitzer et al. |
| 2,455,787 | A | 12/1948 | Linn |
| 2,580,557 | A | 1/1952 | Kolbe |
| 2,606,021 | A | 8/1952 | Hexel |
| 2,709,829 | A | 6/1955 | Marvin |
| 2,738,542 | A | 3/1956 | Clark, Jr. |
| 2,831,699 | A | 4/1958 | Holmes |

(Continued)

FOREIGN PATENT DOCUMENTS

| | | | |
|---|---|---|---|
| CN | 101112856 | B | 6/2010 |
| DE | 19753412 | A1 | 6/1999 |

(Continued)

OTHER PUBLICATIONS

European Patent Office, Extended European Search Report, Application No. 23150404.4, May 23, 2023, 7 pages.

*Primary Examiner* — Karen Beck
(74) *Attorney, Agent, or Firm* — Quarles & Brady LLP

(57) ABSTRACT

Systems and methods provide a torsion bar assembly coupled to one or more casters of a material handling vehicle (MHV). The torsion bar assembly is configured to maintain contact between a travel surface of the MHV (e.g., ground) and a drive wheel of the material handling vehicle throughout the service life of the drive wheel.

15 Claims, 4 Drawing Sheets

(56) References Cited

U.S. PATENT DOCUMENTS

| | | | | | |
|---|---|---|---|---|---|
| 2,891,764 | A | | 6/1959 | Pearne | |
| 3,026,558 | A | * | 3/1962 | Mulholland | B60B 33/02 16/48 |
| 3,331,618 | A | | 7/1967 | Head et al. | |
| 3,380,546 | A | | 4/1968 | Rabjohn | |
| 3,722,613 | A | * | 3/1973 | De Priester | B62B 3/0612 280/93.505 |
| 3,764,157 | A | | 10/1973 | LeBlanc | |
| 4,000,912 | A | | 1/1977 | Donald et al. | |
| 4,246,567 | A | | 1/1981 | Miller | |
| 4,263,979 | A | | 4/1981 | Sturgill | |
| 4,371,191 | A | | 2/1983 | Goldberg et al. | |
| 4,449,725 | A | | 5/1984 | Robinson et al. | |
| 4,534,433 | A | | 8/1985 | Burbank et al. | |
| 4,598,784 | A | | 7/1986 | Tronich et al. | |
| 4,637,093 | A | | 1/1987 | Kassai | |
| 4,750,579 | A | | 6/1988 | Jarl et al. | |
| 4,805,710 | A | | 2/1989 | Jarl et al. | |
| 4,884,936 | A | | 12/1989 | Kawada | |
| 5,072,960 | A | | 12/1991 | Sperko | |
| 5,099,708 | A | | 3/1992 | Chung | |
| 5,163,701 | A | | 11/1992 | Cromley, Jr. | |
| 5,326,128 | A | | 7/1994 | Cromley, Jr. | |
| 5,551,119 | A | | 9/1996 | Wörwag | |
| 5,579,859 | A | | 12/1996 | Quellhorst et al. | |
| 5,590,735 | A | | 1/1997 | Cartier | |
| 5,628,377 | A | | 5/1997 | Le Gloan | |
| 5,649,454 | A | | 7/1997 | Midha et al. | |
| 5,685,555 | A | | 11/1997 | McCormick et al. | |
| 6,056,304 | A | | 5/2000 | Brambilla | |
| 6,135,485 | A | | 10/2000 | Filbrun | |
| 6,244,025 | B1 | | 6/2001 | Ferris et al. | |
| 6,357,077 | B1 | | 3/2002 | Jones, Jr. et al. | |
| 6,484,359 | B1 | | 11/2002 | Guttmann et al. | |
| 6,543,798 | B2 | | 4/2003 | Schaffner et al. | |
| 6,550,101 | B2 | | 4/2003 | Plate | |
| 6,604,414 | B1 | | 8/2003 | Claussen et al. | |
| 6,759,952 | B2 | | 7/2004 | Dunbridge et al. | |
| 6,940,415 | B2 | | 9/2005 | Nagata et al. | |
| 7,017,228 | B2 | | 3/2006 | Silverstein et al. | |
| 7,070,028 | B2 | | 7/2006 | Reybrouck et al. | |
| 7,093,319 | B2 | | 8/2006 | Lemeur, Jr. et al. | |
| 7,267,349 | B2 | | 9/2007 | Sica et al. | |
| 7,497,449 | B2 | | 3/2009 | Logger | |
| 7,593,797 | B2 | | 9/2009 | Izawa et al. | |
| 7,762,129 | B2 | | 7/2010 | Niklas et al. | |
| 7,770,904 | B2 | | 8/2010 | Passeri | |
| 7,782,183 | B2 | | 8/2010 | Wieser | |
| 7,861,820 | B1 | | 1/2011 | Goodwin et al. | |
| 7,874,223 | B2 | | 1/2011 | Sugar et al. | |
| 7,896,358 | B2 | | 3/2011 | Hoff | |
| 7,918,514 | B2 | | 4/2011 | Dal Pra’ | |
| 8,356,688 | B2 | | 1/2013 | Passeri et al. | |
| 8,616,603 | B2 | | 12/2013 | Yahner | |
| 8,720,616 | B2 | | 5/2014 | Kofoed et al. | |
| 8,731,785 | B2 | | 5/2014 | McCabe et al. | |
| 8,733,770 | B2 | | 5/2014 | Nafziger et al. | |
| 8,763,990 | B2 | | 7/2014 | Day | |
| 9,002,557 | B2 | | 4/2015 | Goncalves et al. | |
| 9,085,203 | B2 | | 7/2015 | Duppong et al. | |
| 9,168,784 | B2 | | 10/2015 | DeChristopher et al. | |
| 9,302,893 | B2 | | 4/2016 | Goncalves et al. | |
| 9,403,667 | B2 | | 8/2016 | McCabe et al. | |
| 9,533,863 | B2 | | 1/2017 | Plachta et al. | |
| 9,593,003 | B2 | | 3/2017 | Goncalves et al. | |
| 9,956,822 | B1 | | 5/2018 | Yu | |
| 11,420,666 | B2 | | 8/2022 | Hölle | |
| 11,712,924 | B2 | | 8/2023 | Peterson et al. | |
| 2001/0013692 | A1 | * | 8/2001 | Murase | B60G 3/00 280/124.1 |
| 2004/0055108 | A1 | * | 3/2004 | Lemeur, Jr. | B60B 33/045 16/44 |
| 2005/0144923 | A1 | | 7/2005 | Melone et al. | |
| 2005/0156391 | A1 | | 7/2005 | Krenzin | |
| 2006/0090885 | A1 | | 5/2006 | Montgomery et al. | |
| 2006/0102778 | A1 | * | 5/2006 | Goguelet | B66F 9/07572 244/49 |
| 2006/0213305 | A1 | | 9/2006 | Sugar et al. | |
| 2006/0231312 | A1 | * | 10/2006 | Passeri | B62B 3/0612 280/47.11 |
| 2009/0001740 | A1 | | 1/2009 | Kofoed et al. | |
| 2011/0126617 | A1 | | 6/2011 | Apeztegui et al. | |
| 2012/0049610 | A1 | | 3/2012 | Lew | |
| 2012/0235100 | A1 | | 9/2012 | McCabe et al. | |
| 2013/0278406 | A1 | | 10/2013 | Weston | |
| 2014/0060715 | A1 | | 3/2014 | Winshtein et al. | |
| 2014/0260233 | A1 | | 9/2014 | Giovanardi et al. | |
| 2015/0274495 | A1 | | 10/2015 | Goncalves et al. | |
| 2016/0340162 | A1 | * | 11/2016 | Standard | B62B 5/00 |
| 2021/0188030 | A1 | * | 6/2021 | Bartels | B66F 9/07586 |

FOREIGN PATENT DOCUMENTS

| | | | | | |
|---|---|---|---|---|---|
| EP | 0556543 | A2 | | 8/1993 | |
| EP | 1022166 | A2 | | 7/2000 | |
| EP | 1147968 | A2 | * | 10/2001 | B62B 3/0612 |
| EP | 1147968 | B1 | | 10/2001 | |
| EP | 1588979 | A2 | | 10/2005 | |
| EP | 3279009 | A1 | | 2/2018 | |
| FR | 2544259 | A1 | | 10/1984 | |
| JP | H11180104 | A | | 7/1999 | |
| JP | 2000142012 | A | | 5/2000 | |
| JP | 2002087039 | A | | 3/2002 | |
| JP | 2003079671 | A | | 3/2003 | |
| JP | 2005350154 | A | | 12/2005 | |
| JP | 2010089615 | A | | 4/2010 | |
| JP | 2011046336 | A | | 3/2011 | |
| WO | 2006113511 | A2 | | 10/2006 | |
| WO | WO-2011130431 | A2 | * | 10/2011 | B60P 3/06 |
| WO | WO-2023072467 | A1 | * | 5/2023 | B60W 10/18 |

* cited by examiner

TORSION BAR ASSEMBLY FOR A MATERIAL HANDLING VEHICLE

CROSS-REFERENCE TO RELATED APPLICATIONS

This application claims the benefit of U.S. Provisional Patent Application No. 63/296,664, filed Jan. 5, 2022, entitled "TORSION BAR ASSEMBLY FOR A MATERIAL HANDLING VEHICLE," which is hereby incorporated by reference.

BACKGROUND

Warehouses typically employ the use of multiple material handling vehicles, specifically, operators may utilize pallet trucks to move pallets about the warehouse. Pallet trucks may be powered or may be manually pulled or pushed by an operator.

BRIEF SUMMARY

In one aspect, the present disclosure provides a material handling vehicle that can include a vehicle frame, a fork assembly attached to the vehicle frame, a steerable drive wheel, and a first caster assembly and a second caster assembly on laterally opposing sides of the steerable drive wheel. The material handling vehicle can further include a torsion bar assembly including a torsion bar pivotally coupled to the vehicle frame and rigidly coupled to the first and second caster assemblies, and at least one preload member coupled between a distal end of the torsion bar and the vehicle frame. The preload member can be configured to pivot the torsion bar relative to the vehicle frame in a first direction, thereby adjusting a static location of the first and second caster assemblies.

The system and techniques as described and illustrated herein concern a number of unique and inventive aspects. Some, but by no means all, of these unique aspects are summarized below.

Aspect 1 generally concerns a material handling vehicle.

Aspect 2 generally concerns the material handling vehicle of any previous aspect including a vehicle frame.

Aspect 3 generally concerns the material handling vehicle of any previous aspect including a fork assembly mounted to the vehicle frame.

Aspect 4 generally concerns the material handling vehicle of any previous aspect including a steerable drive wheel mounted to the vehicle frame.

Aspect 5 generally concerns the material handling vehicle of any previous aspect including one or more caster assemblies, mounted to the vehicle frame, adjacent the steerable drive wheel.

Aspect 6 generally concerns the material handling vehicle of any previous aspect including a torsion bar assembly.

Aspect 7 generally concerns the material handling vehicle of any previous aspect including a torsion bar rigidly coupled to the one or more caster assemblies.

Aspect 8 generally concerns the material handling vehicle of any previous aspect including at least one preload member coupled to a distal end of the torsion bar.

Aspect 9 generally concerns the material handling vehicle of any previous aspect in which the preload member selectively applies a torsional force on the torsion bar to adjust a static position of the one or more caster assemblies.

Aspect 10 generally concerns the material handling vehicle of any previous aspect in which the steerable drive wheel is laterally offset from a longitudinal axis of the material handling vehicle.

Aspect 11 generally concerns the material handling vehicle of any previous aspect in which the preload member is a first preload member coupled to a first end of the torsion bar.

Aspect 12 generally concerns the material handling vehicle of any previous aspect in which an opposing second end of the torsion bar is rotationally fixed relative to the vehicle frame.

Aspect 13 generally concerns the material handling vehicle of any previous aspect in which the torsion bar assembly includes a first preload member coupled to a first end of the torsion bar and a second preload member coupled to an opposing second end of the torsion bar.

Aspect 14 generally concerns the material handling vehicle of any previous aspect in which the one or more caster assemblies includes a first caster assembly and a second caster assembly.

Aspect 15 generally concerns the material handling vehicle of any previous aspect in which the first and second caster assemblies are mounted on laterally opposing sides of the steerable drive wheel.

Aspect 16 generally concerns the material handling vehicle of any previous aspect in which the preload member includes an adjustment screw threadedly engaged with the preload member.

Aspect 17 generally concerns the material handling vehicle of any previous aspect in which clockwise adjustment of the adjustment screw is configured to increase a contact force between the adjustment screw and an underside of the vehicle frame.

Aspect 18 generally concerns the material handling vehicle of any previous aspect in which increasing the contact force applied to the underside of the vehicle frame by the adjustment screw is configured to rotate the preload member away from the vehicle frame about an axis formed by the torsion bar.

Aspect 18 generally concerns the material handling vehicle of any previous aspect in which rotation of the preload member about the axis formed by the torsion bar adjusts the static position of the one or more caster assemblies.

Aspect 19 generally concerns the material handling vehicle of any previous aspect including a first caster assembly and a second caster assembly mounted on laterally opposing sides of the steerable drive wheel.

Aspect 20 generally concerns the material handling vehicle of any previous aspect in which the preload member is configured to threadedly receive an adjustment screw.

Aspect 21 generally concerns the material handling vehicle of any previous aspect in which the adjustment screw bears against an underside of the vehicle frame.

Aspect 22 generally concerns the material handling vehicle of any previous aspect in which the normal force applied by the vehicle frame on the adjustment screw rotates the preload member about an axis formed by the torsion bar.

Aspect 23 generally concerns the material handling vehicle of any previous aspect including one or more casters.

Aspect 24 generally concerns the material handling vehicle of any previous aspect including a base plate mounted between the one or more casters and the vehicle frame.

Aspect 25 generally concerns the material handling vehicle of any previous aspect including a caster arm rigidly mounted to the base plate.

Aspect 26 generally concerns the material handling vehicle of any previous aspect in which the caster arm mounts to the torsion bar at one end and mounts to the one or more casters at an opposing end.

Aspect 27 generally concerns the material handling vehicle of any previous aspect in which rotation of the preload member in a first direction corresponds to rotation of the one or more casters in the same, first direction.

Aspect 28 generally concerns the material handling vehicle of any previous aspect in which rotation of the preload member in a first direction corresponds to rotation of the one or more casters in an opposite, second direction.

Aspect 29 generally concerns the material handling vehicle of any previous aspect including a torsion bar rigidly coupled to the one or more caster assemblies via the caster arm.

Aspect 30 generally concerns the material handling vehicle of any previous aspect in which the adjustment screw applies an increasing contact force to an underside of the vehicle frame upon clockwise rotation of the adjustment screw.

Aspect 31 generally concerns the material handling vehicle of any previous aspect in which the contact force applied to the underside of the vehicle frame by the adjustment screw corresponds to rotation in the preload member about an axis formed by the torsion bar.

Aspect 32 generally concerns the material handling vehicle of any previous aspect in which rotation of the preload member about the axis formed by the torsion bar corresponds to an adjustment in the static position of the one or more casters.

Aspect 33 generally concerns a method of operating the system of any previous aspect.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects, and advantages other than those set forth above will become apparent when consideration is given to the following detailed description thereof. Such detailed description makes reference to the following drawings.

DETAILED DESCRIPTION

Figure 1:
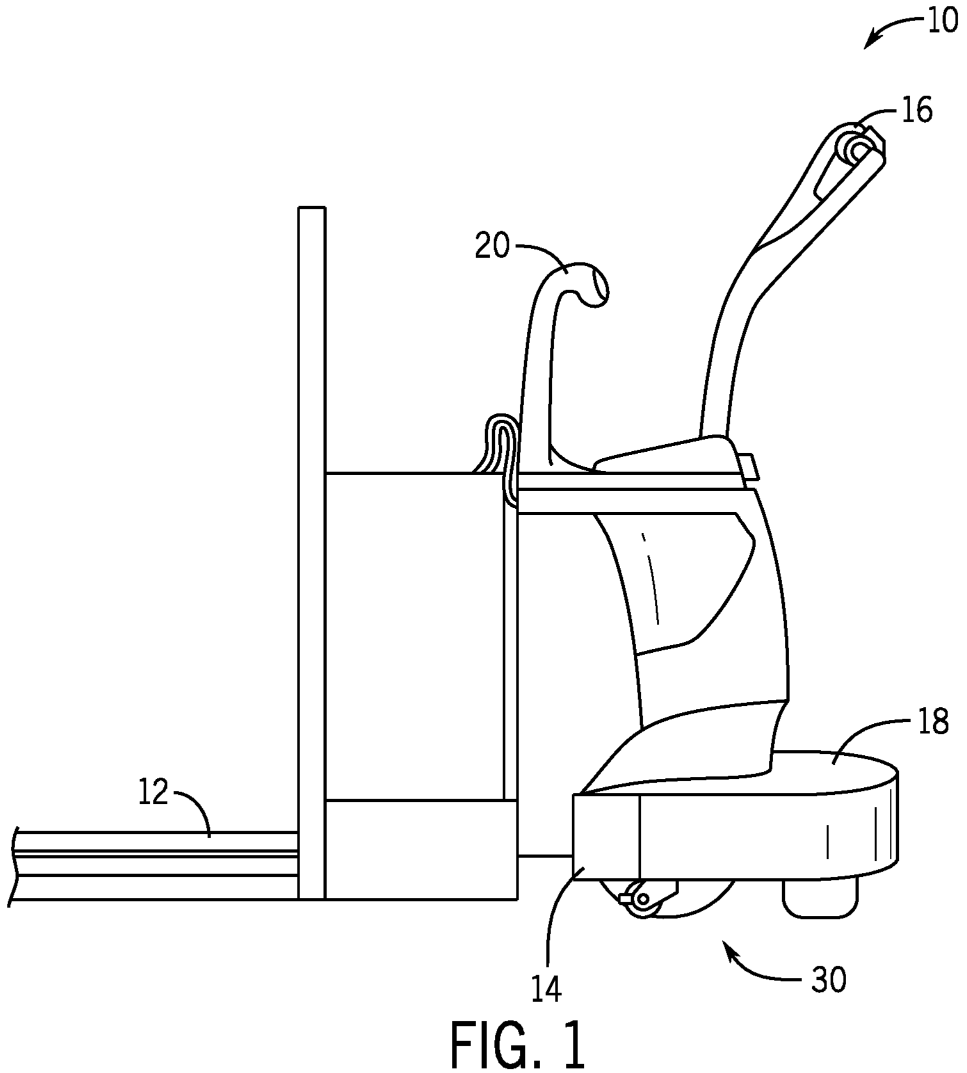
FIG. 1 is a side view of a material handling vehicle ("MHV") in the form of a pallet truck according to aspects of the present disclosure.

Before any aspects of the invention are explained in detail, it is to be understood that the invention is not limited in its application to the details of construction and the arrangement of components set forth in the following description or illustrated in the following drawings. The invention is capable of other aspects and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown but are to be accorded the widest scope of the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

It is also to be appreciated that material handling vehicles ("MHVs") are designed in a variety of classes and configurations to perform a variety of tasks. It will be apparent to those of skill in the art that the present disclosure is not limited to any specific MHV, and can also be provided with various other types of MHV classes and configurations, including for example, lift trucks, forklift trucks, reach trucks, SWING REACH® vehicles, turret trucks, side loader trucks, counterbalanced lift trucks, pallet stacker trucks, order pickers, transtackers, tow tractors, and man-up trucks, and can be commonly found in warehouses, factories, shipping yards, and, generally, wherever pallets, large packages, and/or loads of goods can be required to be transported from place to place. The various systems and methods disclosed herein are suitable for any of operator controlled, pedestrian controlled, remotely controlled, and autonomously controlled material handling vehicles.

Figure 2:
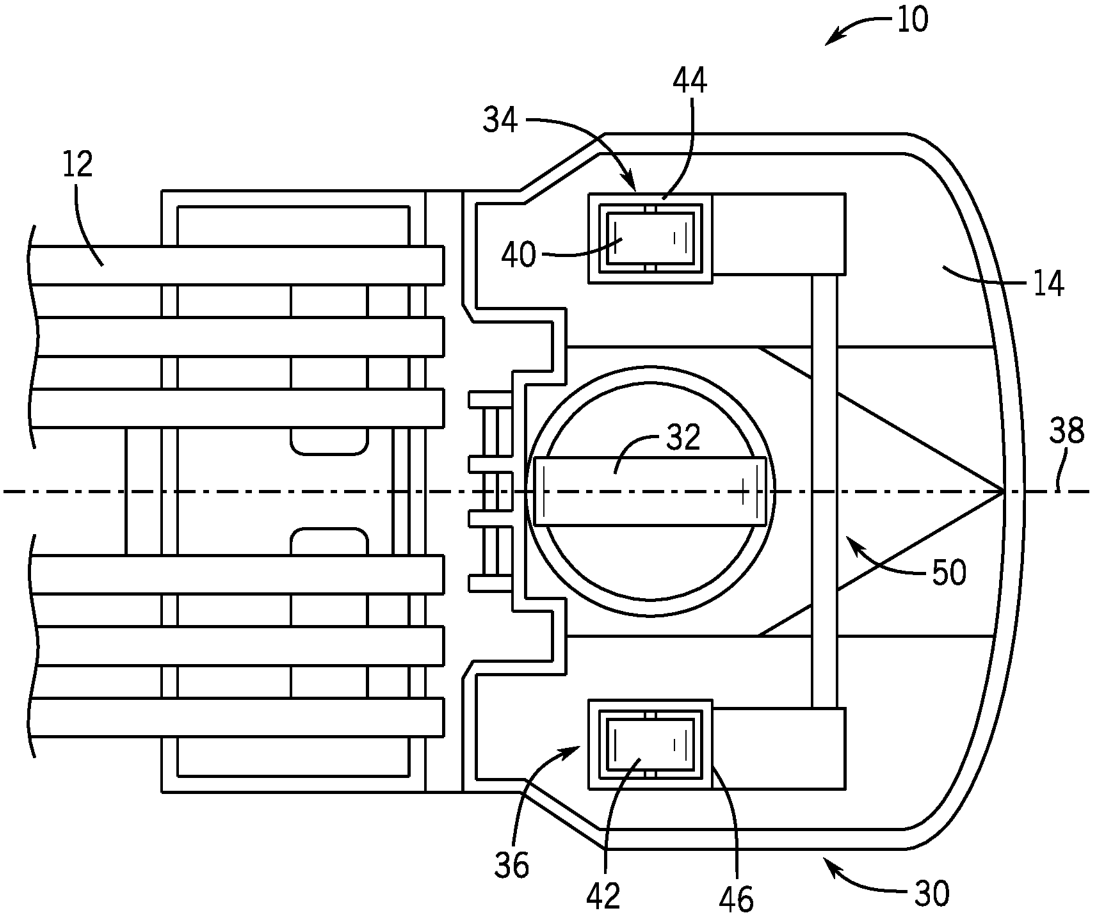
FIG. 2 is a bottom view of the MHV of FIG. 1.

FIGS. 1 and 2 illustrate one non-limiting example of a MHV 10 according to the present disclosure. In the illustrated non-limiting example, the MHV 10 is a pallet truck. The MHV 10 can include a fork assembly 12 having a pair of forks attached to a vehicle frame 14, and a steer arm 16 usable by an operator to guide the MHV. According to some non-limiting examples, the MHV 10 can include a mast and one or more actuators configured to raise or lower the fork assembly 12 relative to the vehicle frame 14. In one example, the steer arm 16 can include electronic and/or mechanical controls usable by an operator to control the one or more actuators to raise and lower the fork assembly 12. In another example, the electronic and/or mechanical controls activate a traction motor housed within the vehicle frame 14. In the illustrated non-limiting example, the MHV can include an operator platform 18 and a control handle 20 that can be manipulated by an operator. The MHV 10 can be powered by a traction motor and guided by the steer arm 16. In other non-limiting examples, the MHV 10 can be autonomously guided. In either case, the MHV 10 can be used to transport a load which may be placed on the fork assembly 12.

The MHV 10 can include a wheel assembly 30 supported by the vehicle frame 14. The wheel assembly 30 can include one or more ground engaging wheels to support the MHV 10. In the illustrated non-limiting example, the wheel assembly 30 is arranged below the operator platform 18. It should be understood that the MHV 10 shown is merely one example of a type of MHV that could be used with the wheel assembly 30. For example, the wheel assembly 30 could be used on other types of MHVs 10, such as those previously noted above. In some non-limiting examples, the wheel assembly 30 can include a drive wheel and at least one caster.

As illustrated in FIG. 2, the wheel assembly 30 can include a drive wheel 32, a first caster assembly 34, and a second caster assembly 36. The drive wheel 32 can be coupled to the vehicle frame 14 and arranged along a longitudinal axis 38 bisecting the MHV 10 in a fore and aft direction (e.g., a roll axis). The drive wheel 32 can be steered through use of the steer arm 16. According to other non-limiting examples, the drive wheel 32 can be steered by a control stick and/or other controls usable by an operator. Alternatively, or additionally, the drive wheel 32 can be steered by a controller that autonomously controls the drive wheel 32. According to some non-limiting examples, the drive wheel 32 can be powered by a traction motor (e.g., an electric motor) coupled to the drive wheel 32.

In one non-limiting example, the first and second caster assemblies 34, 36 are arranged on laterally opposite sides of the drive wheel 32 (e.g., on opposing sides of the longitudinal axis 38). In one non-limiting example, the first caster assembly 34 includes a first caster 40 supported by a first base plate 44 and the second caster assembly 36 includes a second caster 42 supported by a second base plate 46. In the illustrated embodiment, the first and second caster assemblies 34, 36 are not spring-mounted casters, and therefore no spring exists within the assemblies. The first and second casters 40, 42 can swivel about an axis perpendicular to the traveling surface (e.g., warehouse floor). This allows the first and second casters 40, 42 to follow the direction of the drive wheel 32 as the drive wheel 32 turns. As described below, the first and second caster assemblies 34, 36 can be coupled together via a torsion bar configured to apply a preload and/or biasing force to the first and second casters 40, 42.

Figure 3:
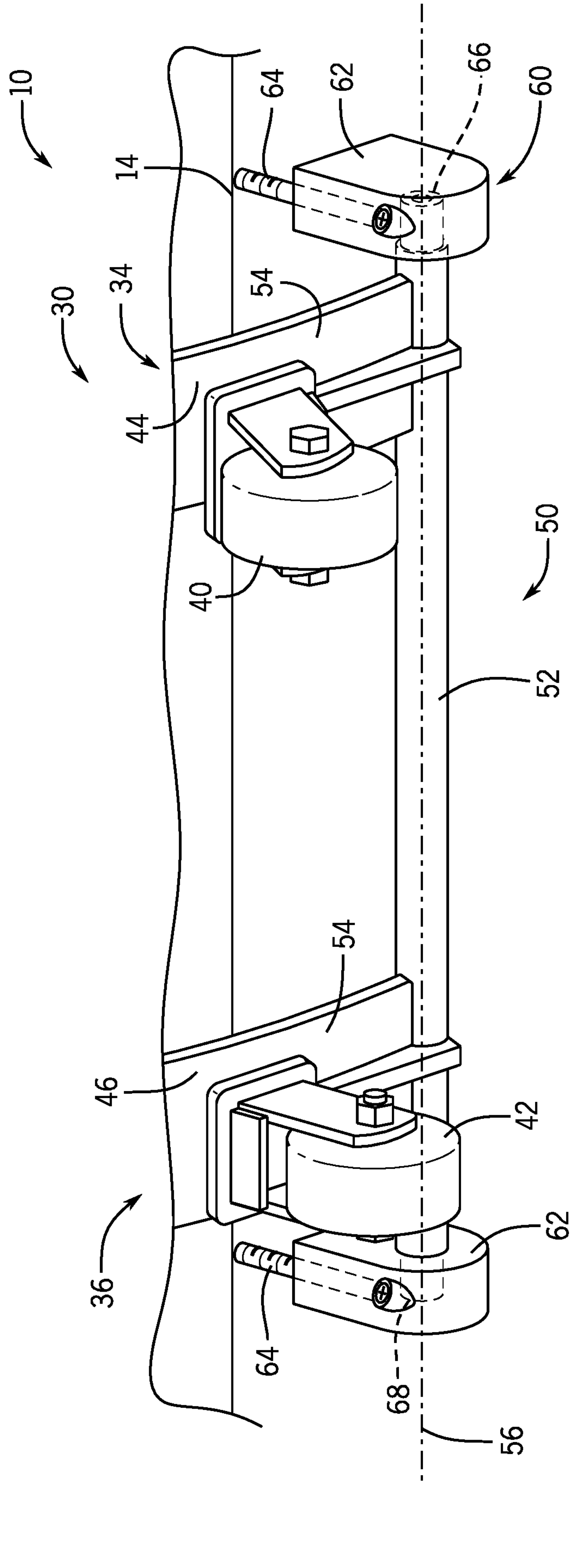
FIG. 3 is a perspective view of a torsion bar assembly for use with the MHV of FIG. 1.

FIG. 3 shows a bottom perspective view of a torsion bar assembly 50. The torsion bar assembly 50 couples the first and second caster assemblies 34, 36 to the vehicle frame 14. Additionally, the torsion bar assembly 50 is configured to couple the first and second caster assemblies 34, 36 together, such that the first and second caster assemblies 34, 36 are tied together. The torsion bar assembly 50 can include a torsion bar 52 arranged below the vehicle frame 14 and extending laterally along the vehicle frame 14. In one non-limiting example, the torsion bar 52 can be pivotally coupled to the vehicle frame 14 via one or more caster arms 54. In the illustrated non-limiting example, the torsion bar assembly 50 includes caster arms 54 rigidly coupled to the torsion bar 52 and extending radially away from the torsion bar 52 (e.g., relative to an axis 56 defined by the torsion bar). The base plates 44, 46 of the first and second caster assemblies 34, 36 can be rigidly coupled to the caster arms 54 such that the first and second caster assemblies 34, 36 can pivot about the torsion bar axis 56. In such an arrangement, the first and second caster assemblies 34, 36 are pivotally coupled to the vehicle frame 14 via the torsion bar assembly 50. The caster arms 54 act as a lever for a load applied to the casters 40, 42, which is then transferred into the torsion bar 52 in the form of a torque applied in a first direction.

The torsion bar assembly 50 can further include at least one preload member 60. The preload member 60 is configured to alter a static location of the casters 40, 42, by pivoting the torsion bar 52 (or twisting) relative to the vehicle frame 14. In some non-limiting examples, the preload member 60 is configured apply a preload torque to the torsion bar 52 in a second direction, which is opposite the first direction described previously. As should be appreciated, the preload applied to the torsion bar 52 is not set by a spring, rather, it is set by the positioning of the preload members 60.

The preload member 60 can be coupled to a first end 66 of the torsion bar 52. According to some non-limiting examples, the torsion bar assembly 50 can include a preload member 60 coupled to the first end 66 of the torsion bar 52, while a second end 68 of the torsion bar 52 is mounted the vehicle frame 14. As should be appreciated, in this configuration, the second end 68 of the torsion bar 52 is rotationally fixed (e.g., no preload member 60). However, in the illustrated non-limiting example, the torsion bar assembly 50 includes a preload member 60 arranged at both the first end 66 and the second end 68 of the torsion bar 52. Thus, neither the first end 66 nor the second end 68 of the torsion bar 52 are rotationally fixed.

In the illustrated non-limiting example, the preload members 60 include one or more preload arms 62 configured to threadedly receive an adjustment screw 64. In one non-limiting example, the adjustment screw 64 may be in the form of a jackscrew. However, in other non-limiting examples, the adjustment screw 64 may take on any other form. The preload members 60 can be rigidly coupled to (e.g., rotationally locked with) each of the first and second ends 66, 68 of the torsion bar 52. For example, the preload arms may include a notch and/or detent into which the first and second ends 66, 68 of the torsion bar 52 may be received. The preload members 60 may be rotatably coupled to the vehicle frame 14, such that rotating the preload members 60 also rotates the casters 40, 42 in the same direction. In another non-limiting example, the preload members 60 may have an inverse movement relationship with respect to the casters 40, 42. For example, downward (away from vehicle frame 14) movement of the preload member 60 may correspond to upward (towards the vehicle frame 14) movement of the casters 40, 42 and vice versa. In yet another non-limiting example, movement of the preload members 60 may correlate with movement of the casters 40, 42. For example, downward (away from vehicle frame 14) movement of the preload member 60 may correspond to downward (away the vehicle frame 14) movement of the casters 40, 42 and vice versa.

The adjustment screw 64 extends into and engages with a threaded opening in the preload arm 62. An end of the adjustment screw 64 bears against (e.g., contacts) the vehicle frame 14 urging the torsion bar 52 to rotate about the torsion bar axis 56 in the second direction (e.g., away from the vehicle frame 14). As should be appreciated, the amount of rotation of the preload member 60 and torsion bar 52 is proportional to the position of the adjustment screw 64. As one non-limiting example, clockwise rotation of the adjustment screw 64 applies a larger contact force against an underside of the vehicle frame 14, which corresponds to a larger rotation of the preload member 60 and the torsion bar 52. Likewise, counterclockwise rotation of the adjustment screw 64 reduces the contact force between the adjustment screw 64 and the vehicle frame 14, which corresponds to less rotation of the preload member 60 and the torsion bar 52.

As a result of rotation of the preload member 60 and torsion bar 52 in the second direction (e.g., away from the vehicle frame 14), the casters 40, 42 move downward (e.g., away from the vehicle frame 14) when the casters 40, 42 are unloaded (e.g., when the MHV 10 is in a service configuration lifted off the ground). However, when the casters 40, 42 are loaded (e.g., when you put the MHV 10 on the ground) the load applied to the casters 40, 42, from the ground applies a torque to the torsion bar 52 in the first direction (e.g., towards the vehicle frame), resulting in the torsion bar 52 twisting in the first direction (e.g., towards the vehicle frame 14). The twisting of the torsion bar 52 applies a set load to each caster 40, 42, which assists in maintaining contact between the casters 40, 42 and the ground throughout the service life of the drive wheel. As should be appreciated, based on the amount of rotation of the preload member 60 and the torsion bar 52, the load on the casters 40, 42 may be larger or smaller. For example, less rotation of the preload member 60 and the torsion bar 52 may correspond to less load on the casters 40, 42 whereas more rotation of the preload member 60 and the torsion bar 52 may correspond to a larger load on the casters 40, 42.

The torsion bar 52 can define a generally unchanging (e.g., constant) spring rate. Thus, as the outer material on the drive wheel 32 wears, the load applied by the ground to the torsion bar 52 in the first direction increases. Correspondingly, the torsion bar 52 pivots in the first direction to maintain contact between the casters 40, 42 and the ground. Put differently, the torsion bar 52 biases the casters 40, 42 towards the ground in order to maintain contact between the casters 40, 42 and the ground throughout the service life of the drive wheel 32, without the need for manual adjustment of the casters. As should be appreciated, the torsion bar 52 is the only biasing element used in this configuration. Thus, there are no coil and/or torsion springs used in combination with the torsion bar assembly 50.

Figure 4:
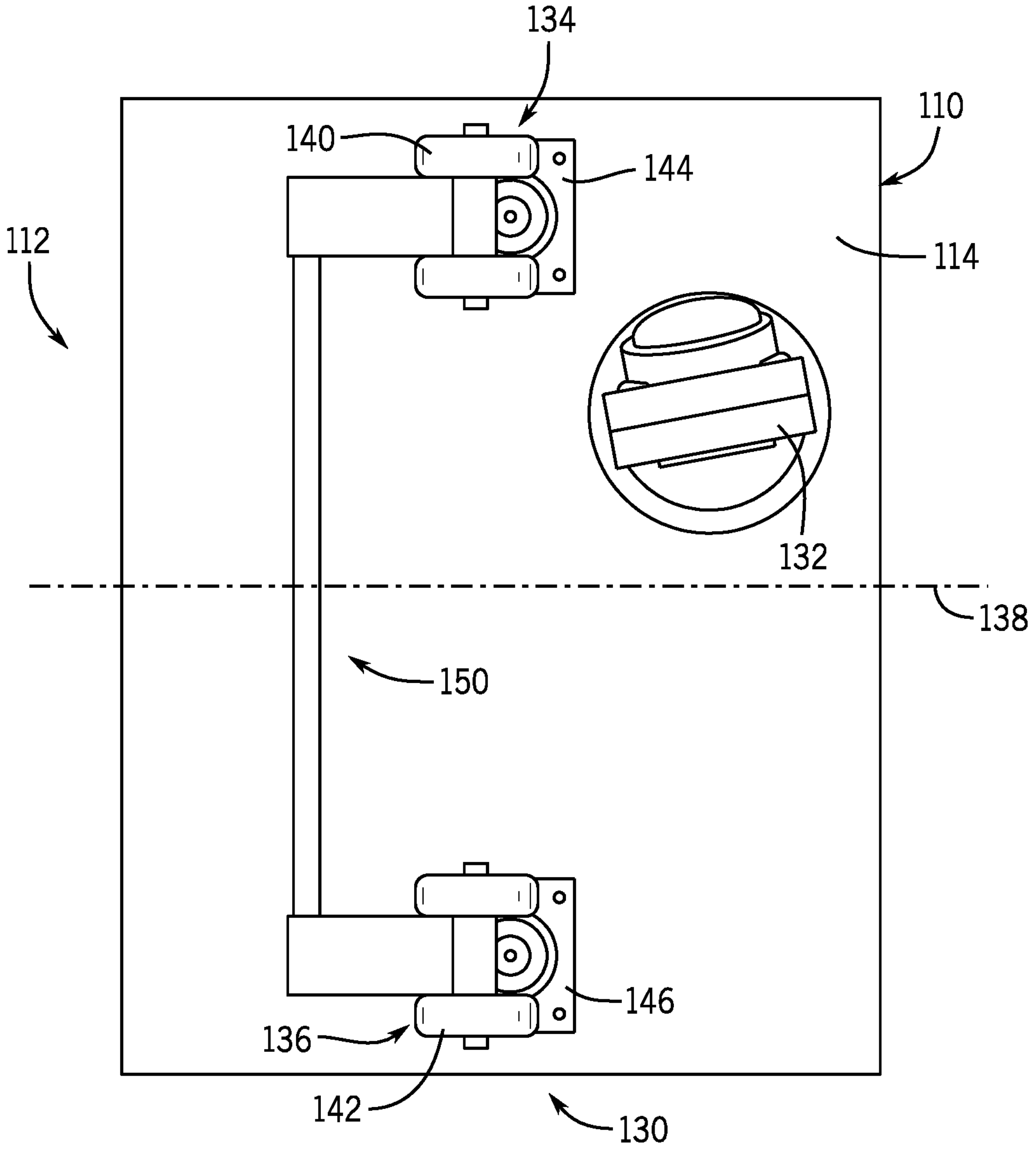
FIG. 4 is a bottom view of another example of a MHV in the form of a pallet truck according to another aspect of the present disclosure.

The torsion bar assembly can also be utilized in MHVs having alternative wheel arrangements. In the following figures, like elements will be referenced using like numerals increased by a value of 100 (e.g., vehicle frame 14 and vehicle frame 114). For example, FIG. 4 illustrates an MHV 110 having a drive wheel 132 laterally offset from the longitudinal axis 138 of the MHV 110. The MHV 110 further includes a torsion bar assembly 150 coupled between first and second caster assemblies 134, 136. The torsion bar assembly 150 functions similarly to the torsion bar assembly 50 as described above with reference to FIGS. 1-3.

In alternative and/or additional non-limiting examples, the drive wheel can be coupled to the torsion bar, such that rotation of the torsion bar adjusts the position of the drive wheel. According to other non-limiting examples, the drive wheel can be coupled to the vehicle frame such that the drive wheel can be moveable in the vertical direction (perpendicular to the ground) via adjustment of the torsion bar.

While various spatial and directional terms, such as top, bottom, lower, mid, lateral, horizontal, vertical, front, and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

I claim:

1. A material handling vehicle, comprising:
- a vehicle frame;
- a fork assembly mounted to the vehicle frame;
- a steerable drive wheel mounted to the vehicle frame;
- one or more caster assemblies, mounted to the vehicle frame, adjacent the steerable drive wheel; and,
- a torsion bar assembly lacking a coil or torsion spring, the torsion bar assembly including:
  - a torsion bar rigidly coupled to the one or more caster assemblies; and,
  - at least one preload member coupled to a distal end of the torsion bar;
  - wherein the preload member selectively applies a torsional force on the torsion bar to adjust a static position of the one or more caster assemblies;
  - wherein the preload member includes an adjustment screw threadedly engaged with the preload member; and
  - wherein clockwise adjustment of the adjustment screw is configured to increase a contact force between the adjustment screw and an underside of the vehicle frame.

2. The material handling vehicle of claim 1, wherein the steerable drive wheel is laterally offset from a longitudinal axis of the material handling vehicle.

3. The material handling vehicle of claim 1, wherein the torsion bar assembly includes a first preload member coupled to a first end of the torsion bar and a second preload member coupled to an opposing second end of the torsion bar.

4. The material handling vehicle of claim 1, wherein the one or more caster assemblies includes a first caster assembly and a second caster assembly, and wherein the first and second caster assemblies are mounted on laterally opposing sides of the steerable drive wheel.

5. The material handling vehicle of claim 1, wherein increasing the contact force applied to the underside of the vehicle frame by the adjustment screw is configured to rotate the preload member away from the vehicle frame about an axis formed by the torsion bar.

6. The material handling vehicle of claim 5, wherein rotation of the preload member about the axis formed by the torsion bar adjusts the static position of the one or more caster assemblies.

7. A material handling vehicle, comprising:

a vehicle frame;

a fork assembly mounted to the vehicle frame;

a steerable drive wheel mounted to the vehicle frame;

a first caster assembly and a second caster assembly mounted on laterally opposing sides of the steerable drive wheel; and, a torsion bar assembly lacking a coil or torsion spring, the torsion bar assembly including:

a torsion bar rigidly coupled to the first and second caster assemblies; and, at least one preload member coupled to a distal end of the torsion bar;

wherein the preload member is configured to threadedly receive an adjustment screw;

wherein the adjustment screw bears against an underside of the vehicle frame; and, wherein the normal force applied by the vehicle frame on the adjustment screw rotates the preload member about an axis formed by the torsion bar.

8. The material handling vehicle of claim 7, wherein the steerable drive wheel is laterally offset from a longitudinal axis of the material handling vehicle.

9. The material handling vehicle of claim 7, wherein the torsion bar assembly includes a first preload member coupled to a first end of the torsion bar and a second preload member coupled to an opposing, second end, of the torsion bar.

10. The material handling vehicle of claim 7, wherein rotation of the preload member about the axis formed by the torsion bar adjusts the static position of the one or more caster assemblies.

11. The material handling vehicle of claim 7, wherein the caster assemblies include:

one or more casters;

a base plate mounted between the one or more casters and the vehicle frame; and, a caster arm rigidly mounted to the base plate, wherein the caster arm mounts to the torsion bar at one end and mounts to the one or more casters at an opposing end.

12. The material handling vehicle of claim 11, wherein rotation of the preload member in a first direction corresponds to rotation of the one or more casters in the same, first direction.

13. The material handling vehicle of claim 11, wherein rotation of the preload member in a first direction corresponds to rotation of the one or more casters in an opposite, second direction.

14. A material handling vehicle, comprising:

a vehicle frame;

a fork assembly mounted to the vehicle frame;

a steerable drive wheel mounted to the vehicle frame;

one or more caster assemblies mounted to the vehicle frame, each caster assembly including:

one or more casters;

a base plate mounted between the one or more casters and the vehicle frame; and, a caster arm rigidly mounted to the base plate; and, a torsion bar assembly lacking a coil or torsion spring, the torsion bar assembly including:

a torsion bar rigidly coupled to the one or more caster assemblies via the caster arm; and, at least one preload member coupled to a distal end of the torsion bar;

wherein rotation of the preload member about the axis formed by the torsion bar adjusts the static position of the one or more caster assemblies;

wherein the preload member is configured to threadedly receive an adjustment screw; and wherein the adjustment screw applies an increasing contact force to an underside of the vehicle frame upon clockwise rotation of the adjustment screw.

15. The material handling vehicle of claim 14, wherein the contact force applied to the underside of the vehicle frame by the adjustment screw corresponds to rotation in the preload member about an axis formed by the torsion bar, and wherein rotation of the preload member about the axis formed by the torsion bar corresponds to an adjustment in the static position of the one or more casters.

* * * * *